United States Patent
Clausen

(10) Patent No.: US 9,619,140 B2
(45) Date of Patent: Apr. 11, 2017

(54) APPARATUS AND METHOD FOR CREATIVE WALLPAPER

(71) Applicant: Samsung Electronics Co. Ltd., Suwon-si, Gyeonggi-do (KR)

(72) Inventor: William Stryker Clausen, Kirkland, WA (US)

(73) Assignee: Samsung Electronics Co., Ltd., Suwon-si (KR)

(*) Notice: Subject to any disclaimer, the term of this patent is extended or adjusted under 35 U.S.C. 154(b) by 106 days.

(21) Appl. No.: 13/712,344

(22) Filed: Dec. 12, 2012

(65) Prior Publication Data

US 2014/0164980 A1    Jun. 12, 2014

(51) Int. Cl.
*G06F 3/0484* (2013.01)
*G06F 3/0488* (2013.01)
*G06F 3/0481* (2013.01)

(52) U.S. Cl.
CPC ........ *G06F 3/04883* (2013.01); *G06F 3/0481* (2013.01)

(58) Field of Classification Search
CPC .... G06F 9/44; G06F 3/04842; G06F 3/04883; G06F 3/0481
USPC ........ 715/763, 766, 770, 778, 781, 230–233
See application file for complete search history.

(56) References Cited

U.S. PATENT DOCUMENTS

| | | | |
|---|---|---|---|
| 5,604,858 A * | 2/1997 | Jefferson et al. | ............. 715/788 |
| 5,745,096 A | 4/1998 | Ludolph et al. | |
| 6,023,273 A * | 2/2000 | Cox | ........ G06F 3/0481 715/744 |
| 7,028,255 B1 * | 4/2006 | Ayers | ........ G06Q 10/10 715/202 |
| 7,343,552 B2 * | 3/2008 | Denoue et al. | ............. 715/230 |
| 7,676,767 B2 * | 3/2010 | Hofmeister et al. | .......... 715/863 |
| 8,031,944 B2 * | 10/2011 | Sanami | ........ G06T 7/0083 382/173 |
| 8,522,130 B1 * | 8/2013 | Gilead et al. | ............. 715/230 |
| 8,768,885 B2 * | 7/2014 | Shaver et al. | ............. 707/620 |
| 2005/0183005 A1 * | 8/2005 | Denoue et al. | ............. 715/512 |
| 2006/0033754 A1 * | 2/2006 | Evans | ........ G06T 11/60 345/629 |
| 2006/0284852 A1 * | 12/2006 | Hofmeister et al. | .......... 345/173 |
| 2007/0061704 A1 * | 3/2007 | Simova | ........ G06F 17/241 715/210 |
| 2007/0101297 A1 * | 5/2007 | Forstall et al. | ............. 715/841 |
| 2008/0034314 A1 * | 2/2008 | Louch et al. | ............. 715/778 |

(Continued)

OTHER PUBLICATIONS

Anonymous: Xilisoft Multiple Desktops: Virtual desktop manager to manage your multiple desktops freely, Jul. 8, 2009, XP055242793.

(Continued)

*Primary Examiner* — Andrey Belousov
*Assistant Examiner* — Seth A Silverman
(74) *Attorney, Agent, or Firm* — Jefferson IP Law, LLP

(57) ABSTRACT

An apparatus and method for creative wallpaper are provided. The method includes presenting a first desktop environment in which icons, menus, applications, or functions can be located and invoked, presenting an uncoverer for revealing a second desktop environment in which icons, menus, applications, or functions can be located and invoked, and if the uncoverer is selected and executed, progressively removing the first desktop environment to reveal the second desktop environment underneath.

12 Claims, 5 Drawing Sheets

(56) References Cited

U.S. PATENT DOCUMENTS

| | | |
|---|---|---|
| 2010/0169310 A1* | 7/2010 | Latzina .................... 707/736 |
| 2011/0058745 A1* | 3/2011 | Sanami ................ G06T 7/0083 |
| | | 382/190 |
| 2011/0072400 A1 | 3/2011 | Watanabe et al. |
| 2012/0206479 A1* | 8/2012 | Bryant .................... G09G 5/02 |
| | | 345/594 |
| 2012/0210263 A1* | 8/2012 | Perry .................... G06F 9/4443 |
| | | 715/769 |
| 2012/0246596 A1* | 9/2012 | Ording et al. ............... 715/799 |
| 2012/0306749 A1* | 12/2012 | Liu ....................... G06F 3/0488 |
| | | 345/163 |
| 2013/0006919 A1* | 1/2013 | Shaver et al. .............. 707/608 |

OTHER PUBLICATIONS

Klauser W et al: Linux X User's Guide, Internet Citation, Dec. 31, 2000, pp. 1-32, XP002662292.

* cited by examiner

APPARATUS AND METHOD FOR CREATIVE WALLPAPER

BACKGROUND OF THE INVENTION

1. Field of the Invention

The present invention relates to an apparatus and method for creative wallpaper. More particularly, the present invention relates to an apparatus and method for an improved customizable wallpaper used in a desktop environment of a computer or comparable device.

2. Description of the Related Art

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

One feature that has become more common recently in mobile terminals as well as in computers is a touch screen interface. For example, most smart phones and tablet computers now are provided with a touch screen interface. The touch screen functions as the display screen and also may function as an input device. For example, a user may select, open, grab and drag, adjust, etc. various applications and content via a touch to the corresponding icon or control displayed on the touch screen. The touch screen may be configured in various ways such as capacitive touch, stylus, etc.

FIG. 1 is a mobile terminal according to the related art.

Referring to FIG. 1, a tablet computer 100 is shown. The tablet computer 100 is essentially a portable display with a touch screen input function. The touch screen display will typically have a main screen including a desktop 110. The desktop may include icons 120 for various applications the user may wish to be able to launch quickly. The desktop 110 may also include a start menu 130 or similar function for the user to access applications and functions that do not have desktop icons provided.

A user will typically change the background or wallpaper of the desktop 110 to include one or more pleasant visual images. The background or wallpaper may be static (for example, a portrait of the user's child) or animated (for example, a solar system showing planets actively orbiting the sun).

The related art wallpaper can be selected by the user. Certain features of the related art wallpaper may be configured by the user when the wallpaper is selected; for example, a user may set the animated wallpaper to show a clock displaying the current time.

However, the related art wallpaper has not provided any function for quick, easy, useful, or creative direct user interaction with a currently used wallpaper.

Accordingly, there is a need for an apparatus and method for providing an improved user interface in a mobile terminal.

SUMMARY OF THE INVENTION

Aspects of the present invention are to address at least the above-mentioned problems and/or disadvantages and to provide at least the advantages described below. Accordingly, an aspect of the present invention is to provide an apparatus and method for managing a desktop environment.

In accordance with an aspect of the present invention, a method for managing a desktop environment is provided. The method includes presenting a first desktop environment in which icons, menus, applications, or functions can be located and invoked, presenting an uncoverer for revealing a second desktop environment in which icons, menus, applications, or functions can be located and invoked, and if the uncoverer is selected and executed, progressively removing the first desktop environment to reveal the second desktop environment underneath.

In accordance with another aspect of the present invention, a method of modifying a desktop wallpaper is provided. The method includes selecting a cutout function, delineating an enclosed area on the wallpaper, selecting a content, and inserting the content in the delineated area.

In accordance with yet another aspect of the present invention, a method of modifying a desktop wallpaper is provided. The method includes selecting a creative wallpaper mode, and writing or drawing directly on the desktop wallpaper.

In accordance with still another aspect of the present invention, a computer device is provided. The computer device includes a controller, a memory, a display screen, a first desktop environment displayed on the display screen, and a second desktop environment covered by the first desktop environment. The first desktop environment may be progressively removed in one or more parts to reveal and enable the second desktop environment.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
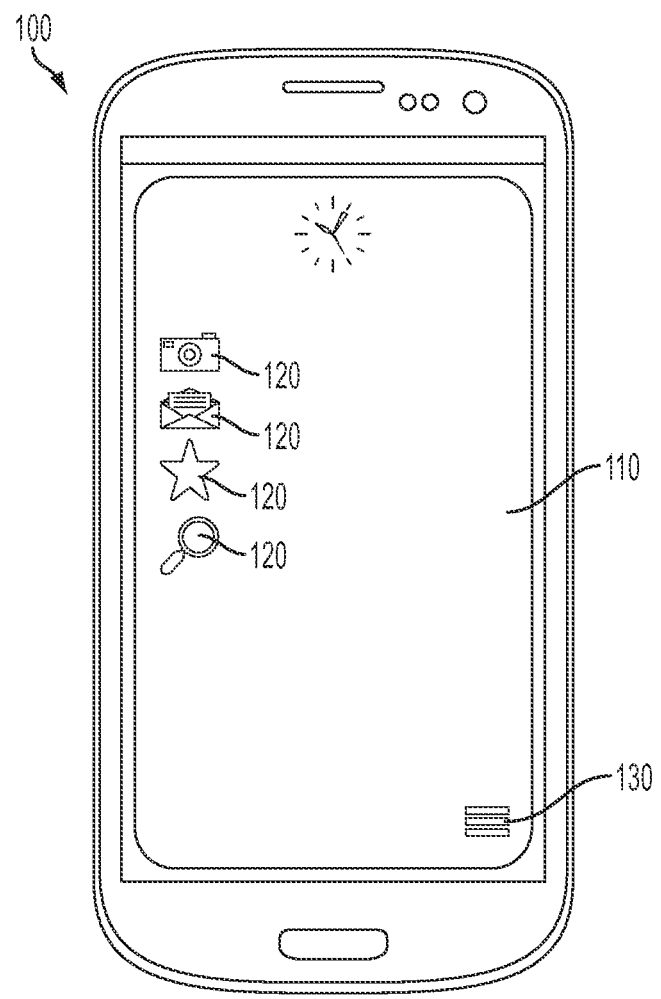
FIG. 1 is a portable terminal according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include an apparatus and method for creative wallpaper. The exemplary embodiments are described herein with regard to a portable terminal. However, the present invention is not limited thereto. For example, exemplary embodiments of the present invention may be included in any desktop environment, including but not limited to smart phones, tablet computers, notebook computers, desktop computers, Personal Digital Assistants (PDAs), etc.

Related art implementations for desktop views allow users to change what they view in the background with pictures or themes. The pictures or themes may be static (such as a portrait, for example) or animated (such as a clock including a second hand showing the current time, for example). While the user can create whatever image he or she prefers, the user cannot do this in real time. For example, the user cannot insert a picture he just took into a current wallpaper, draw a frame around the picture, or link the picture to a specific person's contact information and social networking information stream.

In an exemplary embodiment of the present invention, a background or wallpaper image is customizable by a user directly.

Figure 2A:
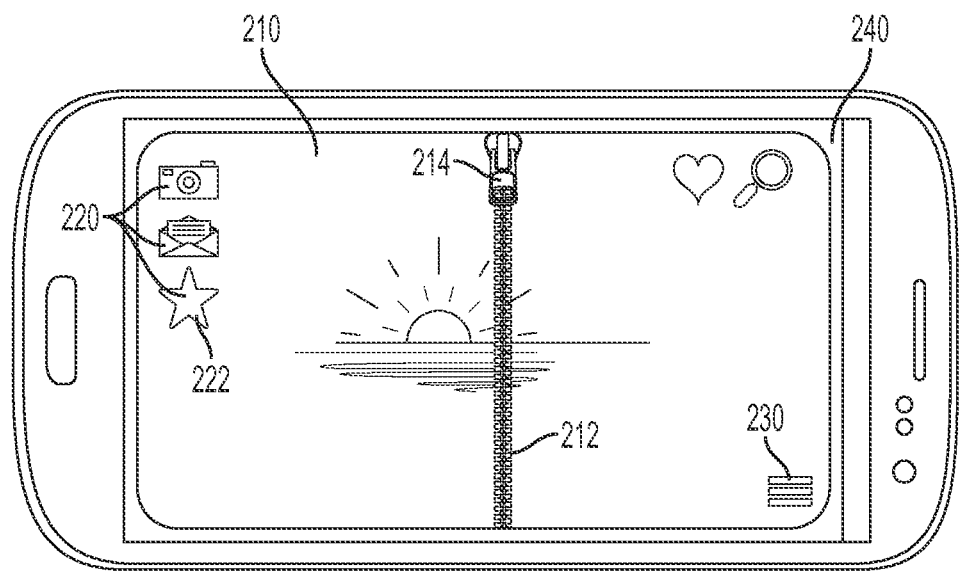
FIGS. 2A-2C are desktops of a mobile terminal according to an exemplary embodiment of the present invention.
Figure 2B:
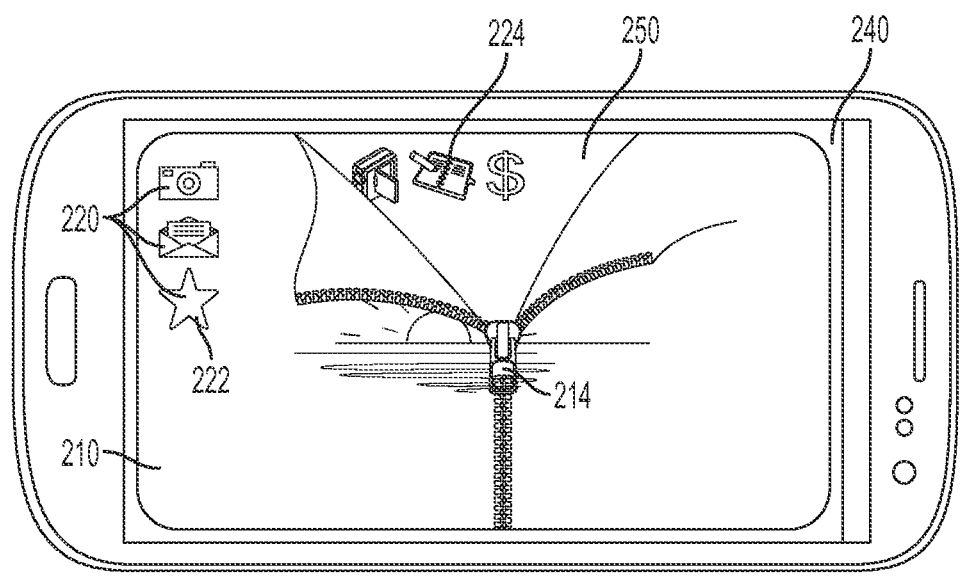
Figure 2C:
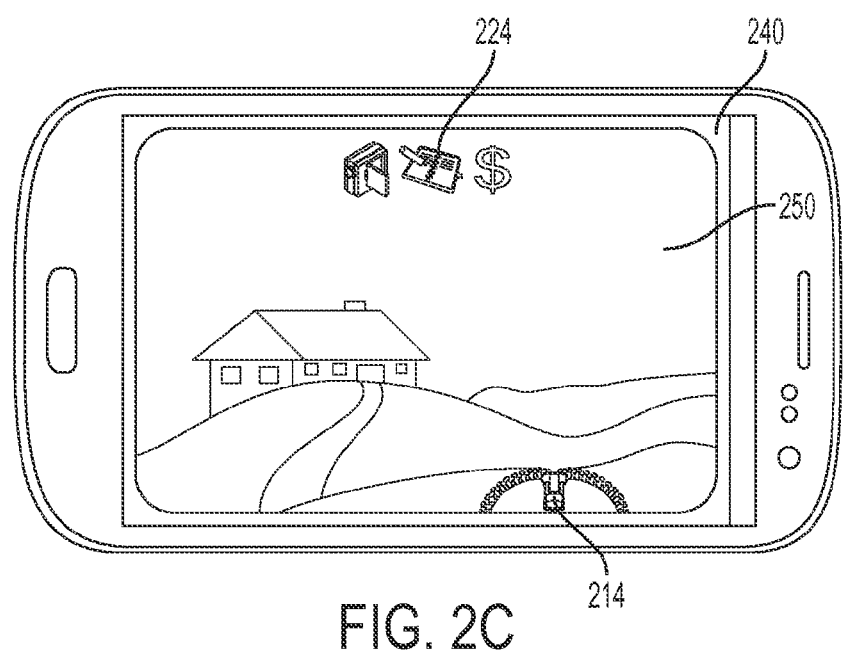

FIGS. 2A-2C are desktops of a mobile terminal according to an exemplary embodiment of the present invention.

Referring to FIGS. 2A-2C, a desktop of a mobile terminal includes a wallpaper 210 in the background and various icons 220 in the foreground. There may further be one or more menus 230 from which the user may select applications or functions not natively accessible from the desktop.

The wallpaper of this exemplary embodiment is on a first desktop 210 and includes an uncoverer such as a zipper 212. The zipper 212 is a feature that can be included in any wallpaper, regardless of whether it is static or animated. The zipper 212 may be displayed as a full set of zipper teeth with a pull 214, a seam with a pull 214, a seam with a slider, or any other depiction that communicates to a user that parts of the wallpaper may be separated at the zipper or seam. The pull or slider 214 can be used to separate two or more parts of the desktop, which then pull or fold back out of view off screen to reveal a second desktop 250 underneath. FIG. 2B shows the zipper 212 in a partially open position, such that part of the second desktop 250 underneath is visible where the parts of the first desktop 210 have separated. Note that the icons of the first desktop 210 remain in their relative locations on the unzipped desktop; as the parts of the first desktop 210 are folded away offscreen, the icons thereon are folded with them.

When the pull or slider 214 is pulled to the fully open position, as depicted in FIG. 2C, the second desktop 250 will be fully revealed and the parts of the original first desktop 210 will be fully removed from the display. The pull or slider 214 will typically remain visible at the edge of the screen to remind the user that he is viewing a second desktop revealed under the zipper. However, the present invention is not limited thereto; for example, a touchscreen or other display may have a border area 240 around the displayed desktop 210. The zipper pull or slider 214 may be pulled off the display to a border area. Similarly, the original desktop 210 may be folded back with only a small portion thereof visible at the edges to remind the user that he is viewing a second desktop revealed under the zipper. However, the present invention is not limited thereto; for example, the parts of the original desktop wallpaper may be moved completely off-screen to the border areas 240. It is preferred that some visual indication be retained and displayed so as to remind the user that the second desktop was revealed by pulling the zipper and may be concealed again by returning the zipper to the closed position.

In any state of revelation, any of the icons of the first desktop 210 and second desktop 250 may be selected and manipulated normally. For example, in FIG. 2B an icon 222 on the first desktop 210 is still visible where the zipper is only partially open, and may be selected as normal. Similarly in FIG. 2B, an icon 224 on the second desktop 250 has been revealed and may also be selected as normal.

Although this exemplary embodiment has been described as a zipper separating or joining two parts of the desktop, the present invention is not limited thereto. For example, the zipper function may be implemented in the form of a turned page, a cabinet door, a box lid, etc. In each case, the implementation should visually suggest to the user that a desktop 210 may be moved aside to reveal a second desktop 250 underneath. The desktop 210 may be opaque to keep the contents of the second desktop 250 private. Alternatively, the desktop 210 may be made at least partially transparent so that the user may see the locations and at least part of the visual images of the icons of the second desktop 250.

In an exemplary embodiment of the present invention, multiple users may use the same portable terminal. Each user may set up one or more zippered second desktops 250. Thus, each user may quickly and easily access his personalized desktop by opening the corresponding zipper.

In an exemplary embodiment of the present invention, the zipper function may be lockable. For example, a user may unlock the zipper function by means of a password, face recognition, voice recognition, or other security feature. Any feature or function for securing access may be used with the lockable zipper. For example, the user may enter a text password, speak a voice-recognition password, draw a pattern password by touch or mouse, etc., before the zipper is unlocked for the user to open.

With the lockable zipper function, the user may thereby group applications that have private or sensitive information such as email passwords, bank account login information, personal photographs, etc., on the second desktop 250. The user may thus have a secured area of memory represented by and accessible through the second desktop 250.

Further, if each user uses at least one lockable zipper function, the portable terminal may function similar to a computer having multiple private user accounts. That is, each user may have personal applications, photographs, etc., which they are willing for others to see and that they keep under an unlocked zipper function. Each user may also have private or sensitive applications, photographs, etc., as described above, which they keep under a locked zipper function.

It is preferred that no more than one lockable or unlocked zipper function be allowed to open at any time. That is, it is preferred that no more than one first desktop 210 and one second desktop 250 be accessible concurrently. However, the present invention is not limited thereto.

In another exemplary embodiment of the present invention, a cutout feature is included.

Figure 3:
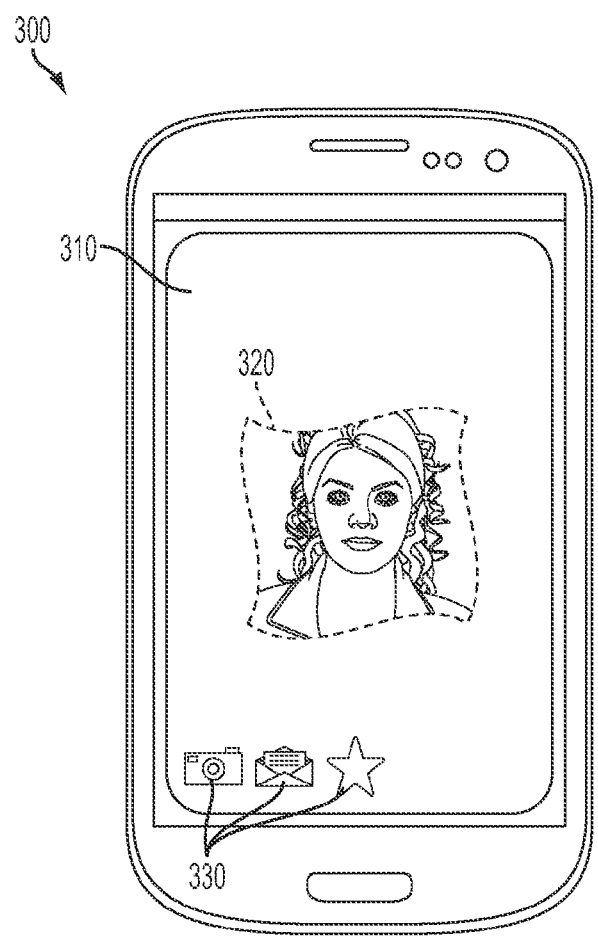
FIG. 3 illustrates a desktop including a cutout feature according to exemplary embodiments of the present invention.

FIG. 3 illustrates a desktop including a cutout feature according to exemplary embodiments of the present invention.

Referring to FIG. 3, a terminal 300 includes a desktop 310. The desktop 310 has various icons 330, and has an exemplary cutout 320 "removed" from the desktop 310. The cutout 320 is a region of the background where the user can draw a closed loop shape, polygon, etc., and insert whatever they choose in the delineated area. For example, the user may insert different wallpaper, pictures, media, streams, drawings, notes, or any other type of data. The cutout may function like a user-defined window in the desktop.

The cutout shape and size may be user-defined as described above. For example, the user may draw a free form cutout. Alternatively, the cutout may be selected from predetermined shapes. The cutout may have a size that is predetermined or user configurable. For example, the user may select a circular cutout 320 and drag one edge of the circle to adjust the cutout 320 to be a desired size.

After the cutout 320 has been defined in position, shape, size, etc., the user may attach any data, application, function, etc., to appear in the cutout. For example, the user may include a video feed from his home computer's webcam in the cutout, so that he can see if his wife or child happens to sit down at the home computer. For another example, he may have a newsfeed scroll text in the cutout. For another example, he may choose to put a favorite photograph in the cutout.

The creation of a cutout 320 may be invoked by drawing on an area of the desktop where there is currently no other selectable icon, menu, or other function. Alternatively, the creation of the cutout 320 may be configured to be executed only when the user explicitly selects to do so. The selection may be by any of various means. For example, the user may double tap or double click on a neutral area of the desktop 310. Alternatively, the user may select the cutout function from a menu. Alternatively, the user may indicate the cutout function by selecting a particular button or option on a mouse, stylus, or other input device.

The contents of the cutout may be linked to other data, functions, or applications. For example, a user may take a photograph of his wife. The user may then cut out a circle in the desktop wallpaper an insert the photograph there. The user may then link the photograph to his wife's contact information in his contacts/phonebook. Thereafter, the user may immediately bring up his wife's contact information, for example, her work and mobile telephone numbers, by selecting the cutout photograph. He could put separate photographs of his wife using her mobile phone and sitting at work in separate cutouts, and configure each to open a phone application and dial a corresponding number immediately upon selection.

For another example, the user may insert a holiday or vacation photograph in a cutout. The user may then link the holiday or vacation photograph to a camera. When the user selects the holiday or vacation photograph, the camera function may then open already configured to save any photographs taken to a holiday or vacation folder or directory.

In an exemplary embodiment of the present invention, the user may directly modify the background as creative wallpaper. For example, the user may write or draw direction on the background wallpaper. The user may thus take notes, for example, for future reference. If the user sets a photograph as the background wallpaper, he may take notes direction with reference to different content shown in the photograph.

The notes, drawings, etc., may be stored linked to, but separately from, the background photograph or image. That is, the original image is not required to be directly altered. The user may save and/or transmit the background image with the notes or drawings. The background with notes may be saved as a separate altered image, or may be linked copies of the original image and the notes or drawings. For example, a user may take a group photograph, write the names of each person above or below them in the photograph, and then send the annotated photograph to family or friends. The annotated photograph can be stored and sent as either a single altered image, or as the original image and a linked file of notes and drawings.

Similarly to the creation of the cutout described above, the notes or drawings on the creative wallpaper may be invoked by drawing on an area of the desktop where there is currently no other selectable icon, menu, or other function. It is preferred that the default interpretation of a loop or other closed shape be selected to clearly invoke either the cutout function described above or the creative wallpaper function. Alternatively, the creative wallpaper may be similarly configured to be executed only when the user explicitly selects to do so. The selection may be by any of various means. For example, the user may double tap or double click on a neutral area of the desktop to enter a creative wallpaper mode. Alternatively, the user may select the creative wallpaper function from a menu. Alternatively, the user may indicate the creative wallpaper function by selecting a particular button or option on a mouse, stylus, or other input device.

Figure 4:
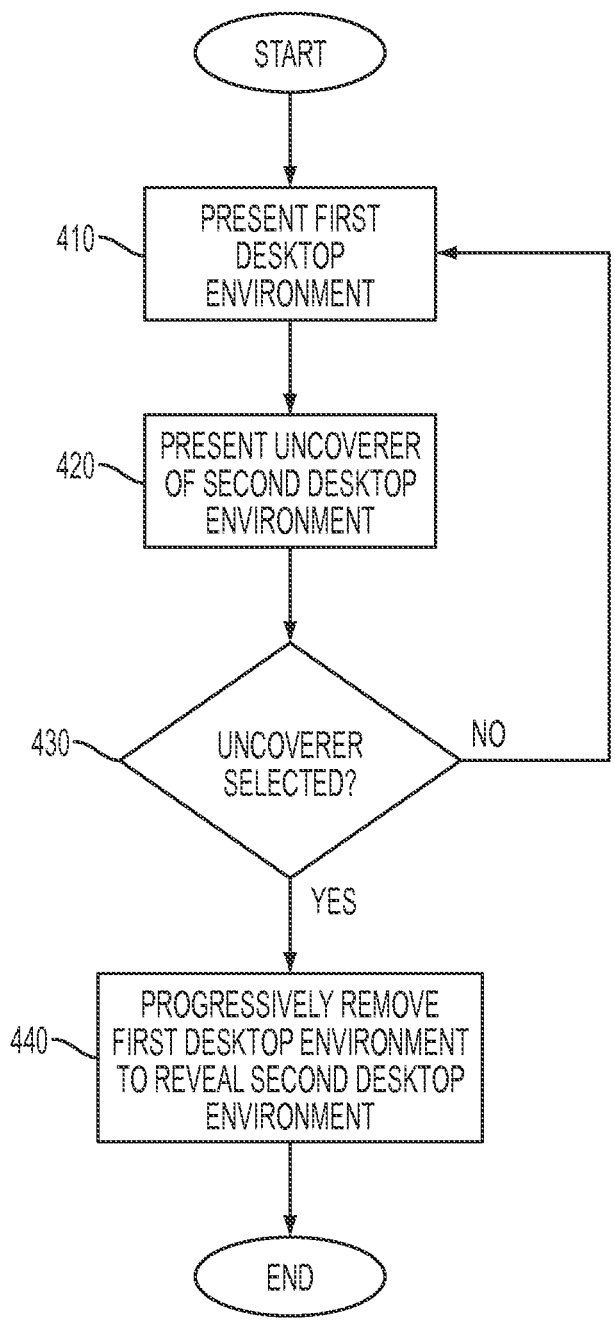
FIG. 4 is a method of managing a desktop environment according to an exemplary embodiment of the present invention.

FIG. 4 is a method of managing a desktop environment according to an exemplary embodiment of the present invention.

Referring to FIG. 4, in step 410 a first desktop environment is presented. The first desktop environment includes one or more selectable icons, menus, applications, or functions.

In step 420, means of revealing a second desktop environment are presented. The means may correspond to the zipper function discussed above. In step 430, it is determined whether the means are selected.

If it is determined that the means are selected, for example, by pulling the zipper pull, then the first desktop environment is progressively removed in step 440. The progressive removal of the first desktop environment reveals a second desktop environment underneath. The second desktop environment includes one or more selectable icons, menus, applications, or functions.

Figure 5:
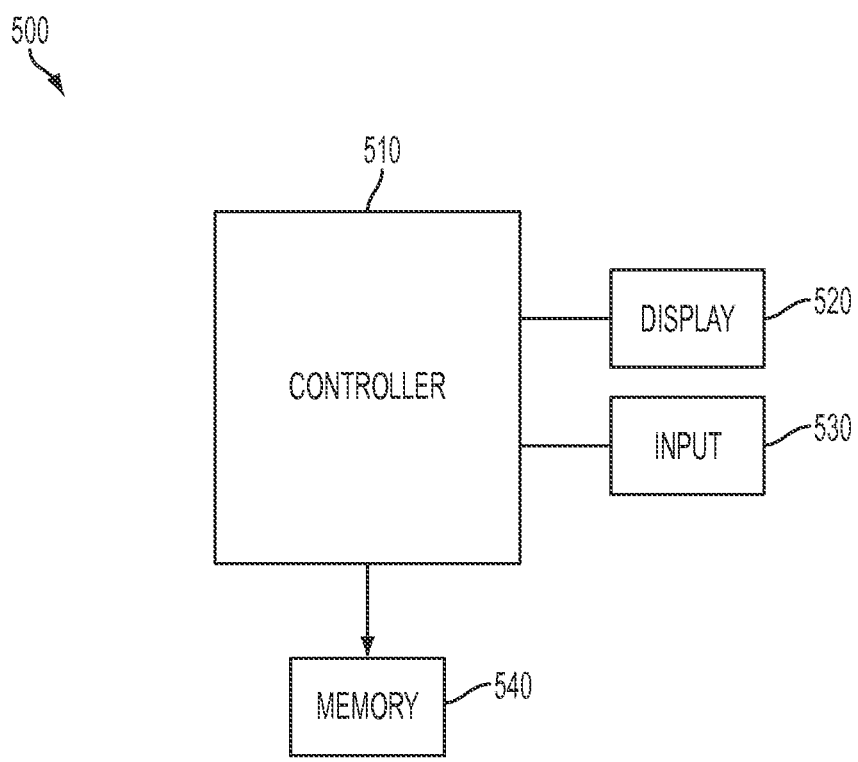
FIG. 5 is a block diagram of a computer device according to an exemplary embodiment of the present invention.

FIG. 5 is a block diagram of a computer device according to an exemplary embodiment of the present invention.

Referring to FIG. 5, the computer device 500 may be embodied, for example, as a terminal, a desktop computer, a tablet computer, a smartphone, or any other computer that includes a desktop environment.

The computer device 500 includes a controller 510 for controlling all functions of the computer's normal operation, including an operating system and applications; a display 520, for displaying output; an input 530, for selecting and inputting data and other inputs; and a memory 540, for storing at least programs, applications, content, and data. The display 520 and the input 530 may be combined in some exemplary embodiments, for example, as a touchscreen. Regardless of whether a touchscreen is used, the input 530 may include separate input means such as a mouse, a keyboard, buttons, a stylus, etc.

In particular, the controller 510 controls to display the first desktop environment on the display 520. If the zipper function, the cutout function, or the creative wallpaper as described above are executed, the controller 510 functions to correspondingly manage the displayed desktop and store changes to the desktop wallpaper, and to display the second desktop or modified wallpaper.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of configuring a portion of a desktop wallpaper to function as an application window or icon, the method comprising:
    selecting a creative wallpaper mode which enables creating directly on the desktop wallpaper;
    while in the creative wallpaper mode, using a cutout function to delineate, as an enclosed area, and cut out the portion of the desktop wallpaper at a location on the desktop wallpaper according to a first user input, while the desktop wallpaper is displayed as an image which remains in the background behind all displayed visual output;
    selecting, according to a second user input, a content comprising a function, application, or data; and
    inserting the selected content into the enclosed area of the cut out portion of the desktop wallpaper,
    wherein a shape of the cut out portion of the desk top wallpaper and the location of the cut out portion on the desktop wallpaper are determined based on the first user input,
    wherein the cut out portion of the desktop wallpaper thereafter functions as the application window or icon with respect to the inserted selected content such that selecting the cut out portion then performs the function if the selected content is the function, launches the application if the selected content is the application, and outputs the data if the selected content is the data, and
    wherein the selecting of the creative wallpaper mode comprises marking according to the first user input of manipulating a stylus, a mouse, a touch, or another input device in a non-selectable area of the desktop wallpaper.

2. The method of claim 1, wherein the cut out portion of the desktop wallpaper functioning as the window or icon comprises linking the enclosed area to another function, application, or data.

3. The method of claim 1, wherein the activation of the cutout function comprises selecting a predetermined input of a mouse, stylus, or menu.

4. The method of claim 1, wherein the activation of the cutout function comprises delineating the enclosed area in an area of the desktop wallpaper where no other selectable icon, menu, or other function is currently located.

5. The method of claim 1, further comprising:
    selecting the creative wallpaper mode which further enables marking directly on the desktop wallpaper; and
    marking directly on the desktop wallpaper according to a third user input of manipulating the stylus, the mouse, the touch, or the other input device,
    wherein the marked desktop wallpaper is thereafter displayed as the image which remains in the background behind all displayed visual output.

6. The method of claim 5, wherein the marking directly on the desktop wallpaper is stored independently of an image of the desktop wallpaper.

7. The method of claim 5, wherein an image is saved of the desktop wallpaper with the marking thereon included as part of the image.

8. The method of claim 5, wherein the selection of the creative wallpaper mode comprises selecting a predetermined input of the mouse, the stylus, or a menu.

9. The method of claim 1, wherein the enclosed area comprises one of a predetermined shape and a free form shape drawn by a user.

10. The method of claim 1, wherein the enclosed area comprises one of a predetermined size and a size configured by a user.

11. A method of configuring a portion of a desktop wallpaper to function as a selectable window or icon, the method comprising:
    activating a creative wallpaper mode related to the configuring which enables creating directly on the desktop wallpaper; and
    while in the creative wallpaper mode related to the configuring, configuring the selectable window or icon, the configuring comprising:
        generating the selectable window or icon comprising an enclosed size and shape determined according to a first user input;
        locating the selectable window or icon at a point on the desktop wallpaper according to a second user input;
        selecting, according to a third user input, a content that will be executed or output upon selection of the selectable window or icon; and
        inserting the content to be executed or output within the enclosed size and shape of the selectable window or icon,
    wherein the configured selectable window or icon thereafter comprises a part of the desktop wallpaper which remains in the background behind all displayed visual output, and
    wherein the selecting of the creative wallpaper mode comprises marking according to the first user input of manipulating a stylus, a mouse, a touch, or another input device in a non-selectable area of the desktop wallpaper.

12. A computer device comprising:
    at least one processor; and
    a display screen,
    wherein the at least one processor is configured to:
        enter a creative wallpaper mode which enables creating directly on the desktop wallpaper;

receive, while in the creative wallpaper mode, an input of a cutout function to delineate, as an enclosed area, and cut out a portion of a desktop wallpaper at a location on the desktop wallpaper according to a first user input, while displaying the desktop wallpaper on the display screen as an image which remains in background behind all displayed visual output;

receive a second user input selecting a content comprising a function, application, or data; and insert the selected content into the enclosed area of the cut out portion of the desktop wallpaper, wherein a shape of the cut out portion of the desk top wallpaper and the location of the cut out portion on the desktop wallpaper are determined based on the first user input, wherein the cut out portion of the desktop wallpaper is configured to function thereafter as an application window or icon with respect to the inserted selected content such that selecting of the cut out portion then causes the at least one processor to perform the function if the selected content is the function, launch the application if the selected content is the application, and output the data if the selected content is the data, and wherein the entering of the creative wallpaper mode is in response to marking according to the first user input of manipulating a stylus, a mouse, a touch, or another input device in a non-selectable area of the desktop wallpaper.

\* \* \* \* \*